No. 676,313. Patented June 11, 1901.
J. A. HEALEY.
EDUCATIONAL APPLIANCE.
(Application filed Mar. 20, 1901.)
(No Model.)
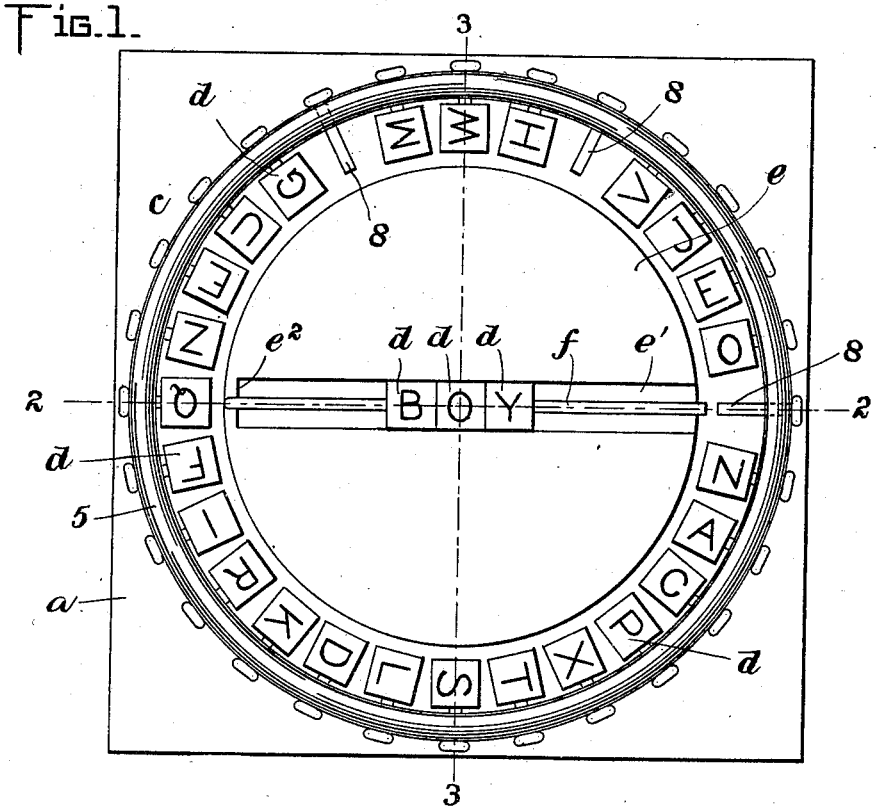
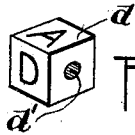
WITNESSES:
INVENTOR:
James A. Healey

UNITED STATES PATENT OFFICE.

JAMES A. HEALEY, OF WAKEFIELD, MASSACHUSETTS, ASSIGNOR TO SELCHOW AND RIGHTER, OF NEW YORK, N. Y.

EDUCATIONAL APPLIANCE.

SPECIFICATION forming part of Letters Patent No. 676,313, dated June 11, 1901.

Application filed March 20, 1901. Serial No. 52,047. (No model.)

*To all whom it may concern:*

Be it known that I, JAMES A. HEALEY, of Wakefield, in the county of Middlesex and State of Massachusetts, have invented certain new and useful Improvements in Educational Appliances, of which the following is a specification.

This invention relates to appliances for teaching spelling and for other analogous purposes in which a series of blocks are employed in connection with a holder on which the blocks are movable, so that any desired number of them can be assembled to form a word, the blocks being provided with letters or other characters on their surfaces.

The invention has for its object to provide an appliance of this character in which the blocks when not in use shall be held on an annular rack from which they are transferable to a receiver or table which is located within the rack and on which they may be grouped to form the desired combination, an appliance embodying my invention presenting in compact form an attractive combination of mechanical parts or elements calculated to excite the interest of the pupil using it.

The invention consists in the improvements which I will now proceed to describe and claim.

Of the accompanying drawings, forming a part of this specification, Figure 1 represents a top view of an educational appliance embodying my invention. Fig. 2 represents a section on line 2 2 of Fig. 1. Fig. 3 represents a section on line 3 3 of Fig. 1. Fig. 4 is a perspective view of one of the blocks.

The same reference characters indicate the same parts in all the figures.

In the drawings, $a$ represents a base or support, which may be a flat board of rectangular form adapted to rest on a table.

$b$ represents a stud or post affixed to the base $a$ and projecting upwardly from the central portion thereof.

$c$ represents an annular rack or holder for a series of blocks $d$, having letters or other characters printed or otherwise inscribed upon their faces. The holder comprises a ring 5, which may be of wood, ratan, or any suitable material, and is connected by angular arms 6 6 with a hub 7, which is adapted to rotate on the stud $b$. The rack also comprises a series of pins 8, inserted in the ring 5 and projecting radially from the inner side thereof. Each of the blocks $d$ has an orifice $d'$ extending through it and formed to receive one of the pins 8, the blocks being loosely mounted on the pins and adapted to be removed therefrom by an inward sliding movement toward the center of the ring 5.

$e$ represents a block-receiver or table to which the blocks $d$ are transferable from the pins 8 in the manner hereinafter described. The table $e$ is rigidly affixed to the upper end of the stud $b$. The table is preferably of circular form and is surrounded by the rack $c$. The upper surface of the table is so arranged relatively to the blocks $e$ that it projects above the under sides of the blocks, as indicated in Fig. 3, and thus prevents the blocks from being entirely removed from the pins 8, excepting at one part of the periphery of the table—namely, the mouth of a slot $e'$, formed in the upper surface of the table and extending nearly across the same, as shown in Figs. 1 and 2. The slot $e'$ is of sufficient length and width to receive a number of the blocks $d$, and its bottom is located slightly below the bottoms of the blocks held on the pins 8. One end of the slot is closed at $e^2$, the opposite end being open. When the rack $c$ is adjusted so that one of the pins 8 is opposite the center of the open end of the slot, the block on said pin can be transferred from the pin to the slot and can be moved along the latter to the closed end $e^2$, if desired. It will be seen, therefore, that enough blocks to fill the slot can be successively transferred from the pins of the rack to the slot, the walls of the latter constituting a guide to hold the transferred blocks in alinement.

It will be observed that the slot $e'$ does not of itself confine the blocks against upward removal from the table. I therefore provide an additional guide to perform this function, said guide being a wire rod or arm $f$, affixed at $f'$ to one edge of the table, the main portion of the arm projecting horizontally over the table and over the center of the slot $e'$, the height of the arm being such that it is in alinement with each pin 8 that is brought into operative relation with the slot $e'$, so that a block transferred from a pin to the slot will be strung upon the rod $f$ and will thus be secured, so that it cannot be raised from the table. The arm $f$ may be secured to the table in any suitable way, preferably by bending it near one end to form a shorter arm $f'$, which is inserted in an orifice in the table, the neck portion $f^2$ being engaged with a slot in the edge of the table, so that the arm $f$ is prevented from swinging laterally.

Each block $d$ is preferably provided with a letter or other character on four of its sides, so that each block presents four characters which may be brought to view by rotating the block on its supporting-pin.

The device is operated by rotating the rack $c$ until the block having the desired letter reaches the mouth of the slot $e'$ and is in alinement with the arm $f$, the block being then transferred to the table and secured by the slot and arm. The rack is then again rotated until the next letter desired is in position for transference, and so on until the desired letters are grouped upon the table.

It is obvious that the rack $c$ may be rigidly fixed and the table $e$ rotatably mounted, the result being the same in either case.

My invention is not limited to the conjoint use of the slot $e'$ and the arm or rod $f$, as the rod alone will serve the purpose of holding a series of blocks in alinement and will prevent the removal of the blocks outwardly or upwardly from the table; but I prefer to use the slot in addition to the rod to more effectively hold the blocks in alinement.

It will be observed that by making the rack of annular form the space which it surrounds is utilized to receive the table, thus giving the apparatus a compact form.

I claim—

1. An apparatus of the character specified, comprising a circular block-rack having a series of block-supporting pins, a block-receiver surrounded by the rack and having a wire guiding-rod, one of said parts being rotatable to bring either pin into alinement with the guiding-rod, and a series of perforated blocks removably mounted on said pins and transferable therefrom to the guide-rod.

2. An appliance of the character specified, comprising a circular block-rack having a series of block-supporting pins, a circular table surrounded by the rack and having a block-guiding rod, one of said parts being rotatable to bring either pin of the rack into alinement with the said rod, and a series of perforated blocks removably mounted on the pins and transferable therefrom to the rod, the periphery of the table forming a guard to prevent the removal of the blocks from all the pins excepting the pin in alinement with the rod.

3. An appliance of the character specified, comprising a supporting-base having a vertical stud, a circular rack having a hub rotatable on said stud, and a series of radial pins, a fixed circular table mounted on the stud and surrounded by the rack, said table having a block-guiding rod and a block-guiding slot under said rod, and a series of perforated blocks removably mounted on the pins of the rack and transferable therefrom to the rod.

In testimony whereof I have affixed my signature in presence of two witnesses.

JAMES A. HEALEY.

Witnesses:
C. F. BROWN,
A. D. HARRISON.